Sept. 2, 1952
E. ARDELL
2,609,109
CASE UNLOADER

Filed May 12, 1948
5 Sheets-Sheet 1

INVENTOR
EDGAR ARDELL
BY
Pennie, Edmonds, Morton and Barrows
HIS ATTORNEYS

Sept. 2, 1952 E. ARDELL 2,609,109
CASE UNLOADER
Filed May 12, 1948 5 Sheets-Sheet 3

INVENTOR
EDGAR ARDELL
BY
Pennie, Edmonds, Morton & Barrows
HIS ATTORNEYS

Sept. 2, 1952     E. ARDELL     2,609,109
CASE UNLOADER
Filed May 12, 1948     5 Sheets-Sheet 4
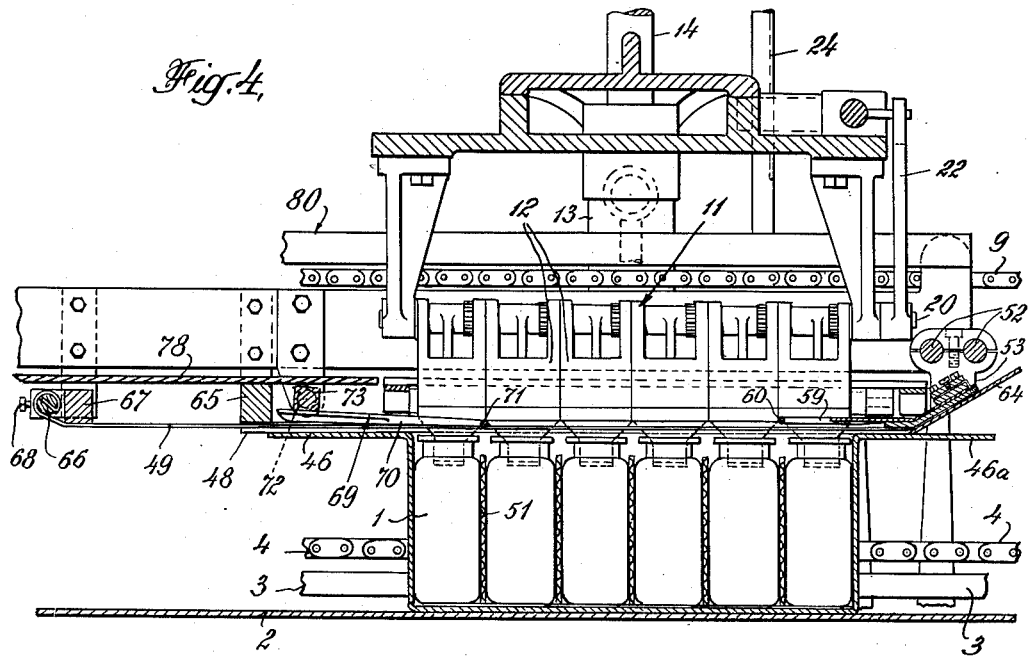
INVENTOR
EDGAR ARDELL
BY
Pennie, Edmonds, Morton and Barrows
HIS ATTORNEYS

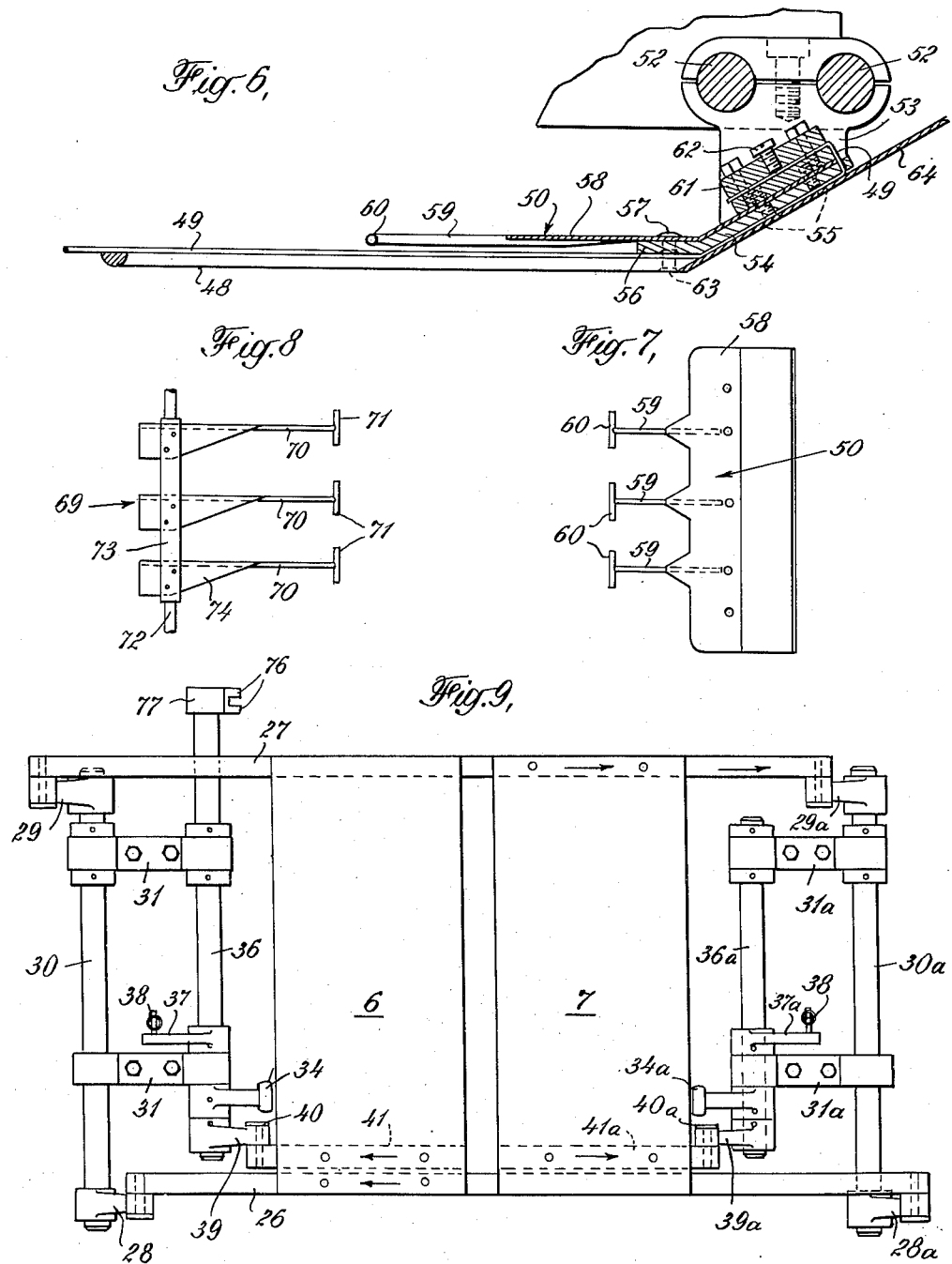

Patented Sept. 2, 1952

2,609,109

UNITED STATES PATENT OFFICE 2,609,109

CASE UNLOADER

Edgar Ardell, Middletown, Conn., assignor, by mesne assignments, to Emhart Manufacturing Company, a corporation of Delaware Application May 12, 1948, Serial No. 28,721

9 Claims. (Cl. 214—1.1)

This invention relates to apparatus for removing or unloading articles from cell cases. More particularly, it relates to unloading containers such as jars, bottles, cans and the like from shipping cases.

As usually packed in these cases such articles are placed in individual pockets or cells formed by partitions consisting of parallel sheets of corrugated board, or similar material appropriately slitted and fitted together at right angles to one another. To be effective in preserving the articles from damage, the jars, bottles, or the like should approximately fit the pockets or cells so as to prevent them from shifting. Consequently, when the charge of articles is lifted out of the case the partitions tend to adhere to the charge so that it is necessary to prevent their removal in order to retain them in the case.

The present invention relates still more particularly to improvements in the shipping case unloading apparatus which is the subject of pending application Serial No. 573,802, filed January 20, 1945, by Paul E. Fischer and Edgar Ardell, and assigned to the same assignee as the present application. In that apparatus the articles are lifted out of the shipping cases by means of a lifting head having individual article lifting devices which on the descent of the lifting head pass between parallel spaced rails and after gripping the articles raise them between these rails to a position above the same, after which the rails are shifted slightly to a position beneath the respective rows of articles, and the articles are deposited thereon and move along the rails out of the apparatus.

While this apparatus has been operated successfully, it has been found that there is a tendency under certain conditions for individual oversized articles to become jammed between the rails as they are lifted out of the case. One of the objects of the present invention is, therefore, to overcome this difficulty and provide a construction for unloading apparatus which is capable of unloading articles which may vary considerably in their lateral dimensions.

In the apparatus as heretofore constructed, the partitioning devices were stripped from the charge of articles by the rails used in that apparatus and between which the articles were raised. In the present apparatus, where rails are eliminated, considerable difficulty has been encountered in devising means for retaining the partitions in the case when the charge is removed. Another object of the present invention, therefore, is to provide a particular form stripping mechanism which will operate on the partitioning devices to prevent their removal along with the charge.

The apparatus of the present invention is intended to handle containers which are either empty or filled. The accompanying drawings illustrate the invention by way of example in connection with an apparatus for unloading empty containers, and the invention will be understood from a consideration of the following description taken in connection with these drawings. In these drawings:

Fig. 1 is a view of the apparatus in vertical transverse section, the location of the section being indicated by broken line 1—1 of Fig. 3;

Fig. 4 is a view in central vertical section taken on line 4—4 of Fig. 3;

Fig. 5 is a view similar to Fig. 4 but with the platen sections closed and the containers removed from the case and deposited upon the platen;

Fig. 6 is a vertical section drawn to an enlarged scale showing the details of certain parts of Fig. 4;

Fig. 7 is a plan view of the stationary stripping device which is arranged at the trailing or rear end of the case;

Fig. 8 is a similar view of the movable stripping device which is arranged at the leading or front end of the case; and Fig. 9 is a plan view to illustrate the support and operation of the separable sections of the platen.

Figure 2:
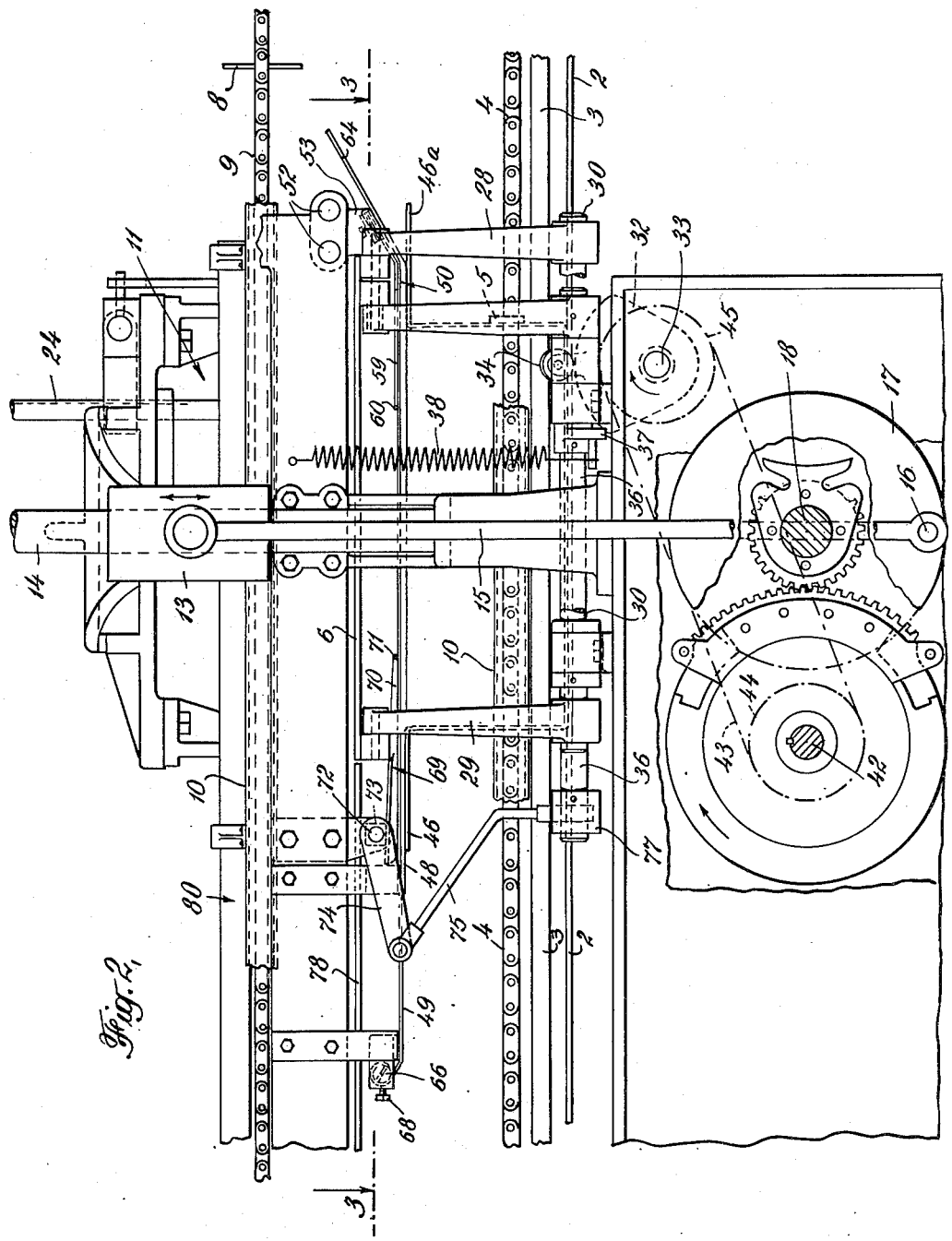
Fig. 2 is a view of the apparatus in side elevation looking from the left to Fig. 1.
Figure 3:
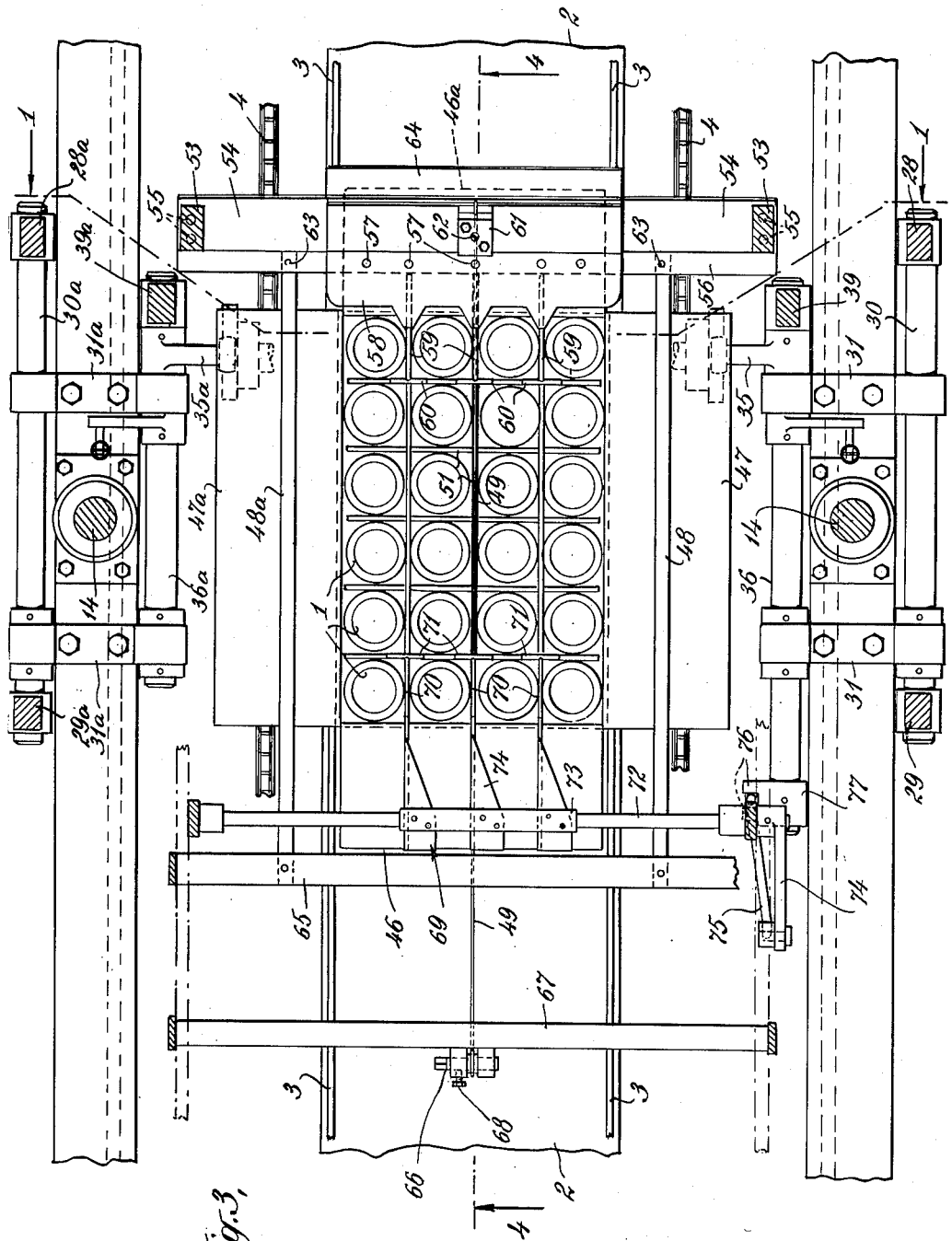
Fig. 3 is a view in horizontal section taken on line 3—3 of Fig. 2.

Referring now to these drawings and first to Figs. 1–3, the cases filled with containers, such as wide mouth jars 1, move into and through the apparatus along a case guideway consisting of a flat horizontal table 2 and two side guide bars 3. The cases are moved successively along table 2 from right to left by means of a pair of case flight chains 4 which move intermittently, as will be later described, and which are provided with spaced flight bars 5.

In their movement along table 2, each case stops at an unloading position which is vertically beneath a pair of laterally shiftable platen sections 6 and 7. Together, sections 6 and 7 form, when shifted to their central or closed position as shown in Figs. 5 and 9, a single horizontal platen member on which the jars 1, after removal from the case, are deposited to be swept out of the apparatus by means of spaced flight bars 8 carried by a pair of article flight chains 9.

Article flight chains 9 are arranged parallel with and above the case flight chains 4. Each of these flight chains travels within a supporting member in the form of a channel bar 10 open at one side as shown in Fig. 1.

The jars 1 are lifted out of the case while the platen sections 6 and 7 are in the open position (Figs. 1, 3 and 4) by means of a vertically reciprocating lifting head which is indicated generally by the reference numeral 11. Lifting head 11 is provided with individual lifting or jar gripping devices 12, one for each jar in the shipping case. In this instance there are twenty-four jars arranged in four rows of six each so that the lifting devices 12 have the same arrangement. These lifting devices project downwardly from a cross supporting member or carriage 13 (Fig. 1) which is arranged to slide vertically on posts 14 arranged as a part of the apparatus frame on opposite sides of the machine. Carriage 13 is raised and lowered by means of a pair of connecting rods 15, pivoted at their upper ends to carriage 13 and at their lower ends to cranks 16 which project from the outer faces of a pair of crank discs 17. Crank discs 17 are keyed to the opposite ends of a shaft 18 which is rotated intermittently one revolution at a time as will be described more in detail later on. The individual jar gripping devices 12, each consist of a pair of internally operating jaws 19 arranged to engage the internal shoulder below the neck of the jar as shown in Fig. 1 when the jaws are expanded. Jaws 19 are pivoted respectively on shafts 20 and 21 which extend lengthwise of the lifting head and are interconnected by the pinions shown in Fig. 1 so that a rocking movement of shaft 20 in one direction causes shaft 21 to rock in the opposite direction. Each of the four shafts 20 across the lifting head is provided with an actuating lever 22 (Figs. 1 and 4) which is keyed adjacent the shaft end and which is rocked by a laterally movable rod 23 with which the forked upper ends of levers 22 are engaged. Rod 23 is actuated by the rocking movement of a vertical shaft 24 to which a short arm 25 is slidably keyed. Arm 25 engages the end of rod 23 to move it toward the right as shown in Fig. 1, the rod being moved toward the left by means of a spring (not shown). Vertical shaft 24 is actuated to cause the gripping or release of jars 1 by jaws 19 by means of a cam (not shown) associated with the lower end of shaft 24. Reference may be had to the prior application, above mentioned, for further details of the construction and operation of this mechanism.

Referring now more particularly to Figs. 1 and 9, the supporting and operating mechanism of platen sections 6 and 7 will be described. These platen sections are supported at their opposite ends by means of two bars 26 and 27. Each platen, however, is secured to only one of these bars. Thus, platen section 6 is secured by the rivets shown in Fig. 9 to bar 26, but the opposite ends of the platen merely rest upon bar 27 so that sliding movement between these parts can occur. Conversely, platen section 7 is secured, as by rivets, to bar 27 and the opposite end of this platen merely rests upon and can slide with respect to bar 26.

Bar 26 is supported at its opposite ends by pivotal engagement with the upper ends of two arms 28 and 28–a, while bar 27 is similarly supported by means of two other arms 29 and 29–a. These four arms, 28, 28–a, 29, and 29–a are loosely mounted for pivotal movement on two parallel rods or shafts 30 and 30–a arranged on opposite sides of the apparatus. Fixed shaft 30 is supported by the outer ends of two double bracket members 31 which are bolted, or otherwise secured to the machine frame. Shaft 30–a is supported in a similar way at the outer ends of double brackets 31–a.

The platen sections 6 and 7 are shifted laterally in and out from the closed position of Fig. 9 to the open position of Fig. 1 by the rotation of two cams 32 and 32–a which are pinned to a common operating shaft 33 as shown in Fig. 1, this shaft being appropriately journalled in the side frame members of the apparatus. The outline of these cams may be seen in Fig. 2 from which it will be seen that their rotation will cause the cam follower rollers 34 and 34–a at the tops of the cams to rise and fall. These rollers are pivoted on short arms 35 and 35–a which are pinned onto shafts 36 and 36–a which are parallel respectively with shafts 30 and 30–a and are supported for rocking movement at the inner ends of the two pairs of double brackets 31 and 31–a. Also pinned on shafts 36 and 36–a are two additional short arms 37 and 37–a which extend in the opposite direction from actuating arms 35 and 35–a and to which are attached the lower ends of tension springs 38 and 38–a which maintain follower rollers 34 and 34–a in engagement with cams 32 and 32–a. The upper ends of these springs are secured to the machine frame.

As follower rollers 34 and 34–a move downwardly during the rotation of their respective cams, shafts 36 and 36–a are rocked in opposite directions simultaneously thereby causing the two platen actuating arms 39 and 39–a to move simultaneously toward one another, these arms being pinned respectively to actuating rock shafts 36 and 36–a. Returning now to Fig. 9, actuating arm 39 is operably connected to platen section 6, its upper end being pivoted at 40 to a short bar 41 which is secured to the underside of platen section 6 adjacent supporting bar 26. In a similar way actuating arm 39–a is pivoted at 40–a to a bar 41–a which is secured beneath platen section 7. Hence, as the cams 32 and 32–a rock shafts 36 and 36–a in one direction, the platen sections 6 and 7 are shifted laterally from the open position of Fig. 1 to the closed position of Fig. 9, and vice versa.

Referring now more particularly to Figs. 1 and 2 the driving mechanism for the apparatus includes a modified Geneva gear mechanism by means of which shaft 18 is rotated intermittently through a single complete revolution to cause, through crank discs 17 and connecting rods 15, the lowering and raising of the lifting head 11 to remove a charge of articles from the container at the unloading position. This modified Geneva gear mechanism is illustrated and described in detail in the previously mentioned pending application to which reference may be had for a complete disclosure. However, in Fig. 2, an outline of this mechanism has been illustrated from which its operation will be apparent. It is sufficient to state that the shaft 42, which is driven at a comparatively slow speed from an electric motor and a reduction gearing (not shown) rotates continuously, and during slightly more than ⅓ of each revolution imparts a complete revolution to shaft 18, shaft 18 remaining stationary during the remainder of the revolution of shaft 42.

It will be understood that a complete cycle of the apparatus takes place, that is to say the removal of a single charge or tier of articles from the case, during each complete rotation of continuously rotating shaft 42. Cam shaft 33 which operates the platen sections 6 and 7 is rotated from shaft 42 by means of a chain 43 and sprockets 44 and 45 mounted respectively on shafts 42 and 33. The case flight chains 4 and article flight chains 9 are simultaneously intermittently operated by any suitable mechanism which may be driven from shaft 42 as described, for example, in the previously mentioned pending application.

As each case moves into the unloading position, its inner or end flaps 46 and 46-a and its outer or side flaps 47 and 47-a are opened by hand, or otherwise, to a horizontal position extending outwardly from the case body. The side flaps 47 and 47-a are maintained in this position by means of two half round bars or rods 48 and 48-a. Likewise the two end flaps 46 and 46-a are held by means of a single taut wire 49 which is arranged lengthwise of the center of the case. The rear stationary stripping device which is indicated by numeral 50, which serves to engage the crisscross partitions 51 and retain them in the case while the article being removed therefrom is supported by the same means which is used to support the rear ends of rods 48 and wire 49. This is shown in detail in Fig. 6. Extending crosswise of the apparatus between its side frame members are two spaced parallel rods 52 (Figs. 2, 4, 5 and 6) and secured to these rods on each side of the case guideway are two bracket members 53.

A crosswise supporting member 54 is fixed at its opposite ends to brackets 53 by pairs of screws 55, the formation of brackets 53 being such as to place the wider portion of support 54 at an angle of about thirty degrees to the horizontal for a purpose which will appear later. Support 54 is provided along its left edge with a narrow horizontal portion 56 and the rear stripping device 50 is secured to this narrow portion 56 by a series of five rivets 57. Device 50, as shown in Fig. 7, comprises a metal plate 58 having a series of holes to receive the rivets 57 and preferably having an upturned rear portion which lies against the upper surface of support 54 as shown in Fig. 6.

A series of T-shaped stripping fingers 59 project from the forward edge of plate 58. These may, for example, be welded to the lower surface of this plate. Their cross bar portions 60 are disposed a distance from the edge of plate 58 which corresponds with the width of the pockets or cells formed by the crisscross partitions 51. Cross bar portions 60 are intended to be located approximately over the crosswise partition strips, but they also serve to engage the lengthwise partition strips should these strips not register directly below the fingers 59 because of lateral shifting of the case in the guideway, or otherwise.

The right hand end of wire 49 which serves to hold the end flaps open is carried beneath support 54, thence upwardly and anchored in an aperture in a block 61 which is fastened at the center of support 54 by two screws as shown in Figs. 3 and 6. A screw 62 serves to secure the wire in place. The rear ends of the two half round bars 48 and 48-a which serve to hold the side flaps 47 and 47-a in position are secured to the narrow forward portion 56 of support 54 by means of rivets 63 which are in line with the series of rivets 57 (Fig. 3).

The purpose of mounting support 54 at an angle to the horizontal is to facilitate the guiding of the forward end flap 46 beneath the rear stripping device 50 and the side flaps 47 and 47-a beneath the half round bars 48 and 48-a. More particularly, to insure the proper guiding of the forward flap 46 a deflector plate or apron 64 is mounted on the lower side of the angular support 54 and secured in place by the heads of screws 55. The forward ends of the side flap guides 48 and 48-a are secured to a cross bar 65, the outer ends of which are mounted in any suitable manner on the machine frame (Fig. 3). The front end of wire 49 for holding the end flaps 46 and 46-a open is secured to a tightening device as shown in Figs. 3 and 4. A short winding rod 66, one end of which is squared to receive a wrench, is mounted in a suitable bracket which in turn is mounted at the center of another cross bar 67 which is secured at its ends to the frame. Winding rod 66 has a cross aperture at its center to receive the end of wire 49 as shown in Fig. 4. Upon turning that rod with a wrench the wire can be stretched to any desired tautness and is then maintained in taut condition by tightening a holding screw 68.

Inasmuch as there has been found to be a tendency for the edge of the forward flap 46 to be cut by its sliding movement in contact with the lower surface of wire 49, and because the partitions 51 sometimes are left projecting slightly above the top of the case after the removal of the charge of jars therefrom, a movable partition stripping device has been provided at the leading or forward end of the case at the unloading position. This forward movable stripping device is indicated generally by numeral 60 and is illustrated in Fig. 8 separate from the remainder of the apparatus. The movement of this device is preferably an angular tilting movement so that it may serve to urge the protruding partitions back into the case as the case leaves the unloading position. Accordingly, this stripping device comprises a series of T-shaped fingers 70 having T cross bars 71 at their ends for the same reason as the cross bars 60 of the rear stripping device, and secured at their rear ends to a shaft 72 mounted crosswise of the apparatus and adapted to be rocked slightly so as to shift fingers 70 from their down position shown in Fig. 4 to their raised position shown in Fig. 5. The central portion 73 of shaft 72 may conveniently be made of squared stock and fingers 70 may be welded to triangularly shaped plates 74 which in turn may be riveted, as indicated in Fig. 8, to the lower flat surface of central portion 73.

Forward stripping device 69 is tilted to its raised position of Fig. 5 prior to the movement of the case to the unloading position beneath platen sections 6, 7, the platens closing simultaneously with the lifting of the stripping device. Then, after the case is in position, the platens open and stripping device 69 is simultaneously lowered. This movement is effected by the rocking movement of shaft 36 which is imparted by cam 32 to shift platen 6 to and from its open position. This mechanism is shown more particularly in Figs. 2 and 3, and comprises an arm 74 which is pinned to the end of shaft 72 which is adjacent shaft 36. Arm 74 is actuated by an angularly shaped link (Fig. 2) which is pivoted at its upper end to this arm and at its lower end is pivotally connected between two short fingers 76 (Figs. 1 and 9) which project from a collar 77 fixed to the end of shaft 36. Hence, as shaft 36 is rocked by the rotation of cam 32 to shift platen 6 from closed to open position the two short fingers 76 are rocked upwardly and communicate this movement through link 75 to arm 74 which causes stripping device 69 to move downwardly. At the opposite shifting of platen section 6 stripping device 69 is raised.

The sequence of operation of this apparatus is as follows. Assuming that a charge has just been lifted out of a case at the unloading position, the platen sections 6 and 7 close by the operation of cams 32 and 32-a and simultaneously with the closing, as just described, the forward or movable stripping device 69 rises from the position shown in Fig. 4 to that shown in Fig. 5. A step movement of the intermittently movable case flight chains 4 now takes place and causes a flight bar 5 to move the previously emptied case from the unloading position toward the left and to bring up from the right a succeeding full case to this position, beneath the plates 6 and 7, this case being shown in the drawings.

The next action is the simultaneous opening of platens 6 and 7 and the lowering of stripping device 69 to the position shown in Fig. 4. The driving member of the Geneva gear mechanism, shown in Fig. 2, now engages the driven member of this mechanism which is keyed to shaft 18, and causes a single rotation of this shaft thereby lowering the article lifting head 11 into the case, this head passing between the two opened platen sections 6 and 7 and the lifting jaws entering the mouths of the containers 1. At the bottom of the stroke of carriage 13 and lifting head 11, vertical actuating shaft 24 for these jaws causes them to expand into the position shown in Fig. 1 and grip the jars. On the upward stroke the jars are raised out of the case and at the completion of this stroke platens 6 and 7 again close and the forward stripping device 69 again rises.

The gripping jaws 19 are then actuated to release the jars onto the platen sections. Then the article flight chains 9 and the case flight chains 4 advance simultaneously, a flight bar 8 of chains 9 moving the articles along the platen sections toward the left onto a scuff plate 78, and thence to a conveyer 79 by which the jars are carried to the next operation, either a washing or a filling machine. As the jars move along scuff plate 78, they may be guided in rows by means of a series of guide bars 80. The simultaneous movement of the case flight chains 4 brings another case into the unloading position and the cycle repeats.

By means of the apparatus of this invention there has been provided a mechanism which operates rapidly and reliably to remove jars, bottles and other containers or articles from shipping cases, and to operate upon the cases without cutting or otherwise damaging the flaps or the crisscross partitioning devices.

It will be understood that changes may be made in the apparatus particularly described above without departing from the spirit of the invention, the scope of which is set forth in the appended claims.

I claim:

1. An apparatus for unloading articles from shipping cases, a case guideway, a horizontal platen disposed above the case guideway and having separable sections forming together a substantially flat surface to receive the articles, means for lifting articles out of a case on the case guideway and depositing them upon the platen, means operable to shift the separable sections of said platen laterally apart a distance not less than the width of the inside of the case to allow the operation of said lifting means between said sections in lifting the articles and to close said sections together prior to the depositing operation of said lifting means, stripping means operable to strip the cases from the articles as they are being raised between said platen sections, means for advancing the articles off the platen, and means for advancing the cases along the case guideway.

2. In apparatus for unloading articles from shipping cases, a platen having a surface for receiving articles, a case guideway, means for lifting articles out of a case on the case guideway and depositing them upon the platen having a substantially flat surface for receiving the articles, said platen being arranged vertically above the case guideway and comprising a pair of sections laterally shiftable with respect to one another, means for simultaneously shifting said sections between an open position for admitting said lifting means between them and a closed position with their inner edges adjacent the center line of the case guideway, means for advancing successive cases along said case guideway, stripping means operable to strip the cases from the articles as they are being raised by the said platen sections and means for sweeping the articles off the said platen.

3. In apparatus for unloading articles from shipping cases having a case guideway with a horizontal platen thereabove together with means for feeding a case along said guideway beneath the platen and a vertically movable lifting head arranged above the palten and operable to lift a tier of articles from the case and deposit them on the platen, the platen being made in two separable sections, the improvement which consists in mechanism for supporting and actuating said platen sections comprising two bars arranged in spaced parallel relation and supported each on two equal length pivoted arms, each of said sections being secured to one of said bars and being slidable on the other bar, and means for simultaneously actuating said bars in opposite directions to open and close said platen sections, respectively to permit the descent of said lifting means and to receive the articles.

4. In apparatus for unloading articles from partitioned shipping cases having a case guideway with a horizontal platen thereabove together with means for feeding a case along said guideway beneath the platen and a vertically movable lifting head arranged above the platen and operable to lift a tier of articles from the case and deposit them on the platen, the improvement which consists in providing a stationary stripping member extending over the rear portion of the case partitions when the case is positioned beneath said platen, a vertically movable stripping member extending over the partitions at the front of said case, and means for raising said forward stripping member during the movement of the case into said position.

5. Unloading apparatus as claimed in claim 4 in which the movable stripping member is tilted to raised position.

6. Unloading apparatus as claimed in claim 4 in which the stripping members comprise series of T-shaped fingers with the bodies of these fingers substantially in register with the partitions running one way of the case and the bar portions thereof substantially in register with the partitions running the other way of the case.

7. In apparatus for unloading articles from partitioned shipping cases having a case guideway with an unloading station together with means for feeding a case along said guideway to said station and a vertically movable lifting head arranged above the platen and operable to lift a tier of articles from the case at said station, the improvement which consists in providing a stationary stripping member extending over the rear portion of the case partitions when the case is positioned at said station, a vertically movable stripping member extending over the partitions at the front of said case, and means for raising said forward stripping member during the movement of the case into said position.

8. Unloading apparatus as claimed in claim 7 in which the movable stripping member is tilted to raised position.

9. Unloading apparatus as claimed in claim 7 in which the stripping members comprise a series of T-shaped fingers with the bodies of these fingers substantially in register with the partitions running one way of the case and the bar portions thereof substantially in register with the partitions running the other way of the case.

EDGAR ARDELL.

REFERENCES CITED

The following references are of record in the file of this patent:

UNITED STATES PATENTS

| Number | Name | Date |
| --- | --- | --- |
| 1,904,720 | Douglass | Apr. 18, 1933 |
| 1,965,745 | Luce et al. | July 10, 1934 |
| 2,294,274 | Buxbaum | Aug. 25, 1942 |
| 2,344,040 | Hoke | Mar. 14, 1944 |
| 2,358,447 | Creamer | Sept. 19, 1944 |